United States Patent

Hwang

Patent Number: 5,551,370
Date of Patent: Sep. 3, 1996

[54] WARNING TRIANGLE ASSEMBLY

[76] Inventor: Wen-Chin Hwang, P.O. Box 82-144, Taipei, Taiwan

[21] Appl. No.: 376,832

[22] Filed: Jan. 23, 1995

[51] Int. Cl.$^6$ .............................. E01F 9/012; G02B 5/12
[52] U.S. Cl. ..................... 116/63 T; 116/63 P; 359/553
[58] Field of Search ............................... 116/63 T, 63 P; 359/553; 40/903, 600, 605, 610, 612; 403/329, 375; 446/85, 108, 120, 121

[56] References Cited

U.S. PATENT DOCUMENTS

| Re. 29,566 | 3/1978 | Brudy | 359/553 |
|---|---|---|---|
| 3,773,012 | 11/1973 | Lindner et al. | 116/63 P |
| 3,822,668 | 7/1974 | Schradieck et al. | 116/63 P |
| 3,908,581 | 9/1975 | Zeizel | 116/63 P |
| 5,323,728 | 6/1994 | Hjelm | 116/63 T |

FOREIGN PATENT DOCUMENTS 625060  9/1961  Italy ......................................... 40/612
1096926  12/1967  United Kingdom .................... 359/553

Primary Examiner—William A. Cuchlinski, Jr.
Assistant Examiner—Willie Morris Worth
Attorney, Agent, or Firm—Alfred Lei

[57] ABSTRACT

A warning triangle assembly including an isometric triangle having an isometric recess at a central portion, the isometric recess being symmetrical to the isometric triangle, the isometric triangle being composed of three angular portions each having a large V-shaped side, a small V-shaped side, a first end side and a second end side, the first end side being provided with a protrusion, the second end side of one of the angular portions being formed with a recess adapted to receive the protrusion of the first end side of another one of the angular portions, the large V-shaped side being provided with a male fastener at one end and a female fastener at another end.

3 Claims, 3 Drawing Sheets 5,551,370

WARNING TRIANGLE ASSEMBLY

BACKGROUND OF THE INVENTION

It is known to provide markers or reflectors constituting a triangular plate or frame having a reflective surface as a marker or indicator for use, for example, in a situation of hazardous roadway conditions. In particular, such triangular markers or indicators are required by law to be carried by drivers in Europe, Japan, Saudi Arabia, . . . etc. Existing indicators or markers, however, suffer from a number of disadvantages and in particular the conventional triangles are bulky in volume thereby causing inconvenience in storage.

Therefore, it is an object of the present invention to provide a warning triangle assembly which may obviate and mitigate the above-mentioned drawbacks.

SUMMARY OF THE INVENTION

This invention relates to an improved warning triangle assembly.

It is the primary object of the present invention to provide a warning triangle assembly which has a collapsible triangle.

It is another object of the present invention to provide a warning triangle assembly which is compact in size.

It is still another object of the present invention to provide a warning triangle assembly which is convenient to use.

It is still another object of the present invention to provide a warning triangle assembly which is easy to manufacture.

It is a further object of the present invention to provide a warning triangle assembly which is practical in use.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

BRIEF DESCRIPTION OF THE DRAWINGS

FIGS. 3 and 4 show the engagement between two angular portions of the warning triangle;

FIG. 5 show the engagement between the warning triangle and the base supports.

DETAILED DESCRIPTION OF THE PREFERRED EMBODIMENT

Figure 1:
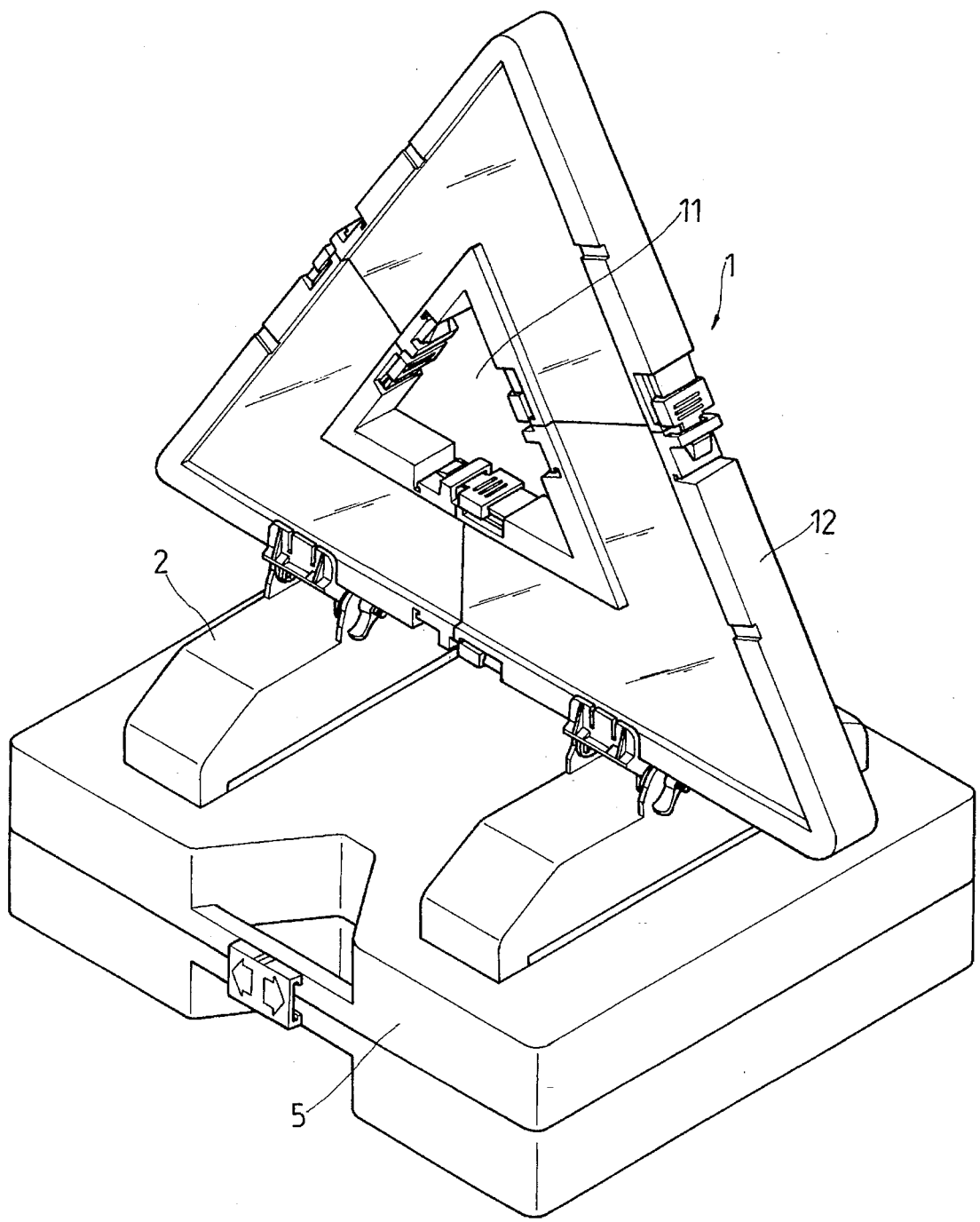
FIG. 1 is a perspective view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
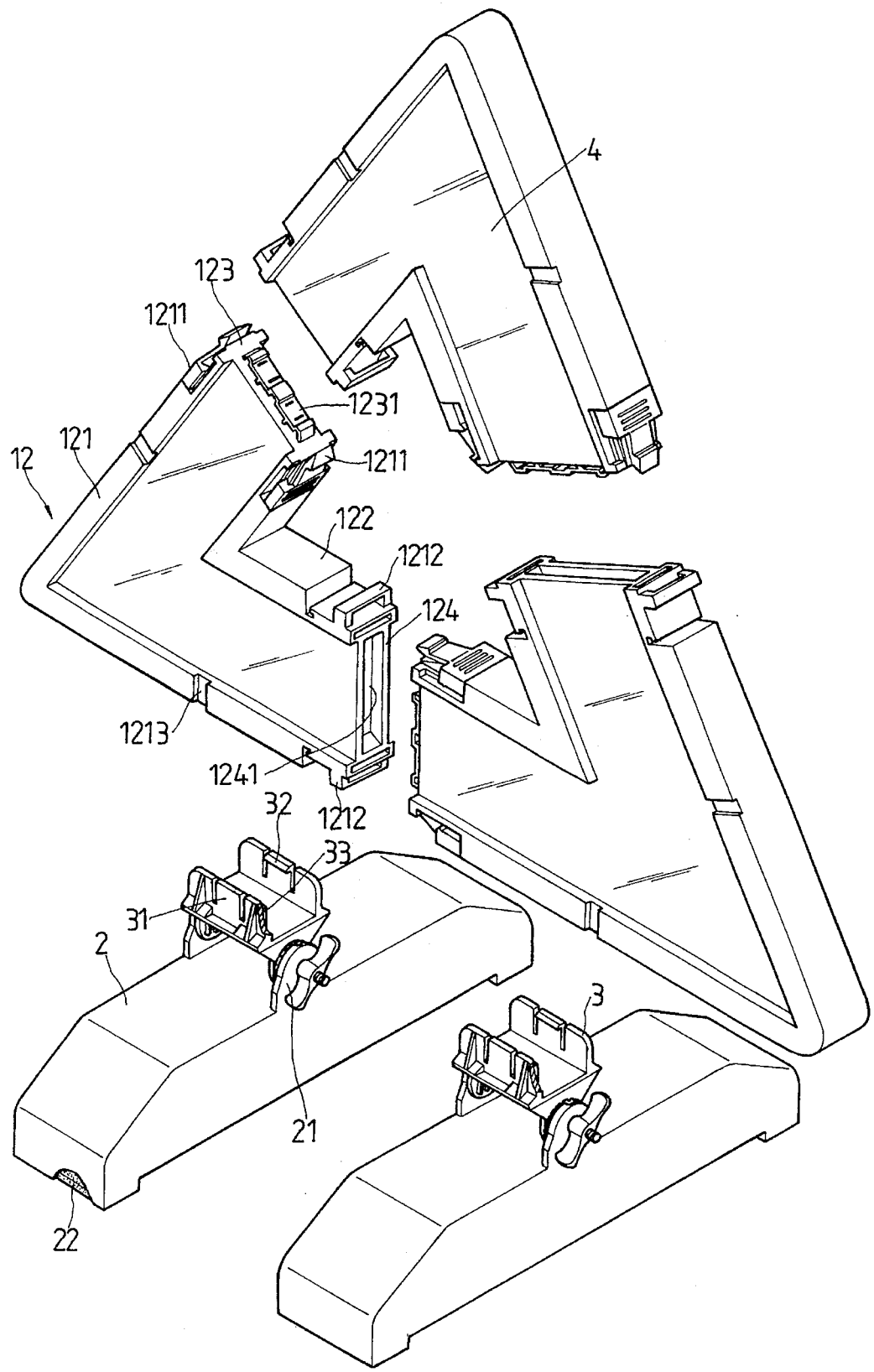
FIG. 2 is an exploded view of the present invention.

With reference to the drawings and in particular to FIGS. 1 and 2 thereof, the warning triangle assembly according to the present invention mainly comprises an isometric triangle 1, two base supports 2, and a container 5.

As shown in FIGS. 2, 3 and 4, the isometric triangle 1 has an isometric recess 11 at the central portion and the isometric recess 11 is symmetrical to the isometric triangle 1. The isometric triangle 1 is composed of three angular members 12 which has a large V-shaped side 121, a small V-shaped side 122, a first end side 123, and a second end side 124. The first end side 123 is provided with a protrusion 1231, while the second end side 124 has a cavity 1241 adapted to receive the protrusion 1231 of the first end side 123 of another angular members 12. The large V-shaped side 121 is provided at one end with a male fastener 1211 and at the other end with a female fastener 1212 engageable with the male fastener 1211 of another angular member 12. Also, the small V-shaped side 122 is provided at one end with a male fastener 1211 and at the other end with a female fastener 1212 engageable with the male fastener 1211 of another angular member 12. Further, there is a reflective panel 4 connecting the large and small V-shaped sides; at both sides of the three angular members 12.

Looking now at FIG. 5, the base support 2 is provided at the top with a pair of lugs 21 between which is rotatably mounted a seat 3. The seat 3 has two spaced uprising walls 31 provided with a retaining hook 32 at the intermediate portion and a protuberance 33 adapted to engage with the groove 1213 of the angular portion 11. In addition, the bottom of the base support 2 is provided with two magnets 22.

Figure 6:
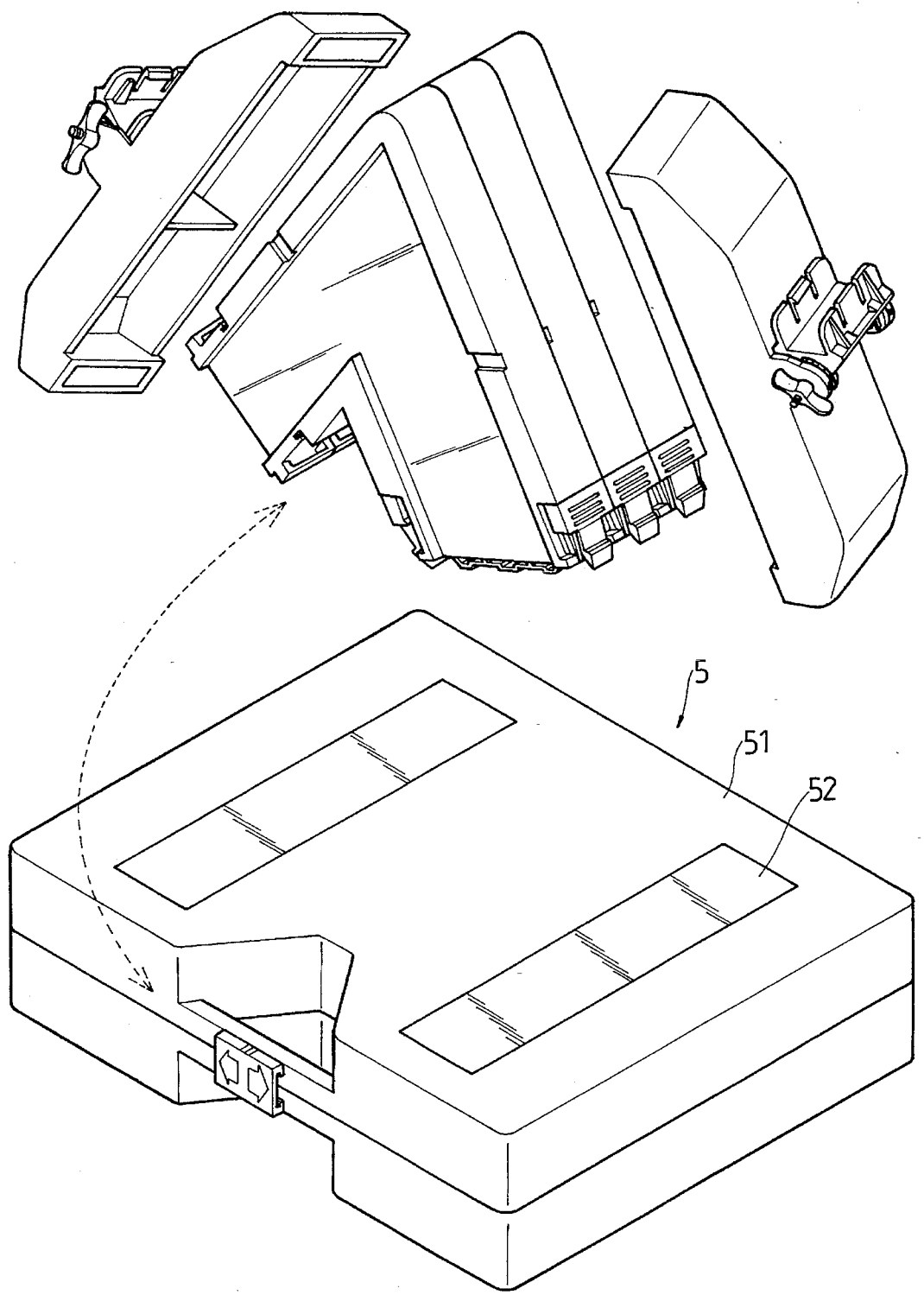
FIG. 6 shows the storage of the warning triangle.

The container 5 is used to receive the isometric triangle 1 when not in use. Further, the top cover 51 of the container 5 is provided with two iron sheets 52 adapted to engage the magnets 22 of the base supports 2 so that when the base support 2 is placed on the iron sheet 52, the base support 2 will be firmly kept in a fixed position (see FIG. 6).

In addition, when not in use, the triangular members 12 and the base supports 2 can be conveniently stored into the container 5.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A warning triangle assembly comprising an isometric triangle having an isometric recess at a central portion, said isometric triangle being symmetrical to said isometric triangle, said isometric triangle being composed of three angular portions each having a large V-shaped side, a small V-shaped side, a first end side and a second end side, said first end side being provided with a protrusion, the second end side of one of said angular portions being formed with a recess adapted to receive the protrusion of the first end side of another one of said angular portions, said large V-shaped side being provided with a male fastener at one end and a female fastener at another end and at least one reflective panel connecting the large and small V-shaped sides of each angular portion.

2. The warning triangle assembly as claimed in claim 1, further comprising two base supports provided with two magnets on a bottom thereof and two seats pivotally mounted thereon having a means for securing said seat to a connecting portion of any one side of said isometric triangle.

3. The warning triangle assembly as claimed in claim 2, further comprising a container for receiving said isometric triangle and said two base supports and having two iron plates on a top cover thereof adapted to engage with the magnets of said base supports.

* * * * *